United States Patent [19]
Weiss et al.

[11] Patent Number: 4,490,128
[45] Date of Patent: Dec. 25, 1984

[54] BEARING-MOUNTED PLASTIC WHEEL

[75] Inventors: Siegfried Weiss; Günther Heurich; Werner Kotzab, all of Schweinfurt, Fed. Rep. of Germany

[73] Assignee: FAG Kugelfischer Georg Schäfer & Co., Fed. Rep. of Germany

[21] Appl. No.: 512,214

[22] Filed: Jul. 8, 1983

[30] Foreign Application Priority Data

Jul. 15, 1982 [DE] Fed. Rep. of Germany ....... 3226419

[51] Int. Cl.³ ............................................. F16H 55/36
[52] U.S. Cl. ................................... 474/166; 474/190; 29/159 R
[58] Field of Search ........................ 474/166, 190, 191; 29/159 R, 159.01

[56] References Cited
U.S. PATENT DOCUMENTS

| 2,841,020 | 7/1958 | Van Deventer | 474/190 X |
| 3,785,217 | 1/1974 | Peura | 474/190 |
| 4,047,445 | 9/1977 | Anderson | 474/190 X |
| 4,326,849 | 4/1982 | Zijderveld | 474/190 X |

Primary Examiner—Stephen J. Novosad
Assistant Examiner—Frank H. McKenzie, Jr.
Attorney, Agent, or Firm—Ostrolenk, Faber, Gerb & Soffen

[57] ABSTRACT

An annular wheel of plastic is rotatably mounted on a central bearing. The wheel has a generally H-shaped cross-section, with radially outward and radially inward arms joined by a radial crossbar. An array of stiffening ribs at various circumferential locations around the crossbar of the H-shaped cross-section stiffen the wheel. To prevent the peripheral travel surface of the outward arm of the wheel from developing undulations during cooling following initial molding of the plastic wheel, the ribs have recesses in their opposite, axially outwardly directed sides. Dimensional relationships between the axial width and circumferential thickness of the rib, and the peripheral surface of the wheel and the thickness of the crossbar of the wheel are disclosed.

16 Claims, 2 Drawing Figures

BEARING-MOUNTED PLASTIC WHEEL

BACKGROUND OF THE INVENTION

The present invention relates to an annular plastic wheel mounted on a bearing, and particularly to means which stiffen such a wheel, yet enable it to have a smooth, non-undulated outer peripheral travel surface over which a belt, or the like, is trained.

The annular wheel rotates around a stationary hub, and an annular bearing is disposed between the rotating wheel and the hub. To strengthen the plastic wheel, radially extending stiffening ribs are disposed at spaced intervals around the wheel. The width of the ribs in the axial or width direction of the wheel is typically less than the width of the peripheral travel surface of the wheel.

Plastic wheels of this type are well known. They are used, for instance, as tensioning rollers in various fields. Over time, increasingly greater demands are being made, particularly on the peripheral travel surfaces of the wheels. At the circumferential locations around the travel surface at which the radial ribs are located, undulations are produced upon manufacture of the wheels, particularly due to the presence of the stiffening ribs. The undulating surfaces can have negative effects on a system provided with the tensioning rolls, particularly when the wheels rotate at high speeds.

SUMMARY OF THE INVENTION

The object of the present invention is to provide a plastic wheel whose travel surface does not become undulating during its manufacture due to the presence of the radially extending stiffening ribs around the wheel.

The annular plastic wheel, according to the invention, has a general H-shaped cross-section defined by an outward arm, the radially outward surface of which is the travel surface of the wheel, an opposite radially inward arm which rides on or is the outer race of the bearing and a crossbar of narrower axial width which joins the inward and outward arms. A plurality of stiffening ribs each extend radially between the outer and inner arms and each also projects axially outwardly in both axial directions from the crossbar of the H-shaped wheel. Each rib is generally rectangular in its cross-section.

According to the invention, each stiffening rib has two opposite recesses defined in it, each extending axially inwardly from its axially outwardly facing sides, and the recesses are provided in each rib at least in the region of the outward arm which carries the travel surface. The recesses narrow each rib axially of the wheel, but not to be as narrow as the crossbar of the H-shaped wheel. In the preferred form, each recess is approximately V-shaped, with an apex at the deepest part of the recess and the apex being rounded.

The stiffening ribs do not extend out to the entire axial width of the travel surface of the plastic wheel as in known plastic wheels, but only over a certain lesser portion of that width. These recesses produce a certain elasticity in the travel surface. As a result, the undulations in that surface can be practically completely avoided. The shape of the stiffening ribs is adapted to the shape of the main body of the wheel so that upon manufacture of the plastic wheel by, for instance, injection molding, the ribs do not prevent uniform shrinkage but, instead participate in the shrinkage movement of the main body. Therefore, no deformations are produced on the travel surface within the circumferential regions of the ribs. Additional machining of the travel surface can, therefore, be dispensed with.

Due to the approximately symmetrical shape of the plastic wheel which results, this embodiment retains high precision upon injection molding.

The shape of the recesses in each rib are most favorable if the axial width of the rib at the depth of the recess amounts to between 20% and 60% of the axial width of the belt travel surface and if the thickness of the rib in the circumferential direction of the wheel corresponds to 50 to 150% of the axial thickness of the crossbar of the H-shaped wheel.

More stable development of the plastic wheel is obtained by the use of stiffening ribs. But, a smooth travel surface of the wheel is obtained as a result of the special development of the recesses in each rib. Within the region of the crossbar of the H-shaped wheel, the travel surface is round, since there is uniform distribution of the material. The crossbar of the wheel also has a stabilizing effect in the sections, i.e. arms of the H-shaped wheel adjoining the crossbar it on both sides. For this reason, the stiffening ribs do not cause any undulations here. Undulations would occur, if at all, only in more remote regions. Here, however, the recesses in the ribs are present, for which reason a smooth travel surface is obtained here also. The same applies, of course, in the regions in which no stiffening ribs are provided any longer.

BRIEF DESCRIPTION OF THE DRAWINGS

The invention is explained further with reference to the drawings.

DESCRIPTION OF A PREFERRED EMBODIMENT

Figure 1:
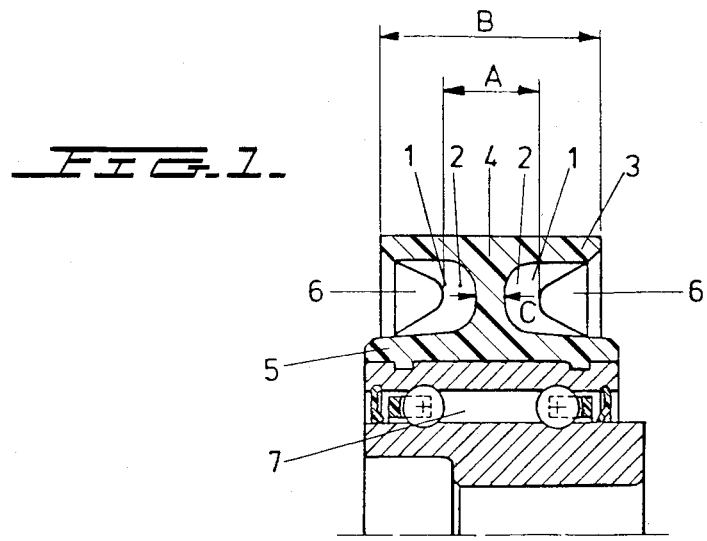
FIG. 1 is a partial cross-section through a plastic wheel arranged on a bearing.

The illustrated plastic wheel has an approximately H-shaped cross-section, including a crossbar 4 connecting the radially outward arm 3 with the radially inward arm 5 of the wheel. U-shaped annular spaces 1 are defined on both sides of the crossbar 4. At the crossbar 4, radially extending, rectangular cross-section stiffening ribs 2 are provided.

In order that a smooth outer peripheral travel surface of the arm 3 of the wheel may be obtained, rounded axially extending recesses 6 are provided at both opposite axial sides of each rib. Each recess has an approximately V shape. In this way, uniform shrinkage of the plastic wheel is obtained during molding, both in the regions of the stiffening ribs 2 and remote therefrom, whereby undulations in the travel surface are avoided.

Figure 2:
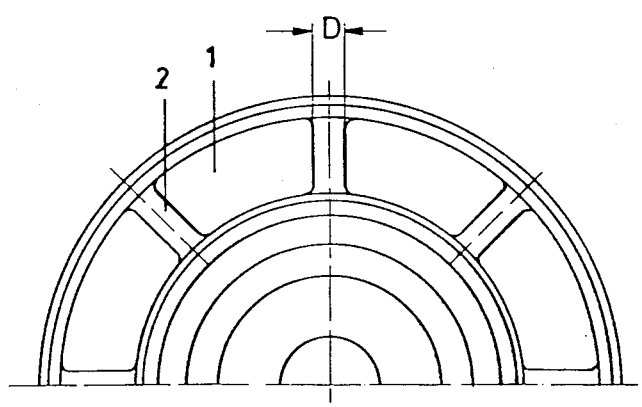
FIG. 2 is an axial top view of the embodiment of FIG. 1.

Preferred dimensions for the rib 2 and the recesses 6 are now described. The axial width of the rib 2 is preferably less than the axial width of the peripheral travel surface of the radially outward arm 3. The V-shaped recesses 6 in the rib give the rib a minimum axial width A at the bottoms of the recesses which is greater than the uniform axial width C of the crossbar 4 of the H-shaped wheel. The axial width A of the rib is in the rangee of 20–60% of the axial width of the peripheral travel surface of the outward arm 3. The V-shaped recesses have a radial height at the outer surface of the rib that occupies almost the entire radial height of the rib. Furthermore, the thickness D of the rib in the circumferential direction of the wheel (FIG. 2) is in the range of 50% to 150% of the axial width or thickness C of the crossbar 4. Additionally, the circumferential thickness D of the rib 2 is less than the axial thickness of the radially outward arm 3 of the wheel. These various optimum dimension assure that upon injection molding and upon cooling of the wheel following the molding, the peripheral travel surface of the wheel does not develop undulations.

The plastic wheel can be used, for instance, as a tensioning wheel or a travel wheel. The wheel is shown mounted here on an anti-friction bearing 7 over a hub. The inward arm 5 of the wheel is at or defines the outer race of the bearing 7. Even at high speeds of rotation of the wheel on its bearing, the inventive design of the wheel assures a vibration-free, low-noise guidance of a drive belt (not shown) trained over the peripheral surface of the wheel. As a result, the lives of the belts and of the anti-friction bearings of the wheel are increased.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A rotatable plastic wheel for being mounted on a central bearing, comprising:
   an annular ring wheel having a generally H-shaped cross-section, including a radially inward arm, a radially outward arm with a radially outward peripheral travel surface, and a radially extending crossbar between the inward and the outward arms and the crossbar being of narrower axial width than either arm;
   a plurality of radially extending wheel stiffening ribs disposed between the inward and the outward arms at the crossbar and the ribs being spaced at circumferential intervals circumferentially around the crossbar;
   a respective recess being defined in each rib at both opposite, axially outwardly facing sides of the rib, at least in the region of the outward arm.

2. The wheel of claim 1, wherein the axial width of each rib is less than the axial width of the travel surface of the outward arm.

3. The wheel of claim 2, wherein each recess on each side of each rib is approximately V-shaped.

4. The wheel of claim 3, wherein the recess has a radial height along the rib which occupies almost the entire height of the rib.

5. The wheel of claim 3, wherein each V-shaped recess has an axially inward apex which is rounded.

6. The wheel of claim 3, wherein the thickness of each rib in the circumferential direction of the wheel is in the range between 50% to 150% of the axial thickness of the crossbar.

7. The wheel of claim 2, wherein the axial width of the rib, measured at the bottom of both recesses at opposite sides thereof, is in the range between 20% and 60% of the axial width of the outward surface of the radially outward arm.

8. The wheel of claim 7, wherein each recess on each of the opposite sides of each rib is approximately V-shaped.

9. The wheel of claim 7, wherein the thickness of each rib in the circumferential direction of the wheel is less than the radial thickness of the radially outward arm.

10. The wheel of claim 7, wherein the thickness of each rib in the circumferential direction of the wheel is in the range between 50% to 150% of the axial thickness of the crossbar.

11. The wheel of claim 10, wherein each recess on each side of each rib is approximately V-shaped.

12. The wheel of claim 11, wherein the recess has a radial height along the rib which occupies almost the entire height of the rib.

13. The wheel of claim 10, wherein the thickness of each rib in the circumferential direction of the wheel is less than the radial thickness of the radially outward arm.

14. The wheel of claim 13, wherein each rib is rectangular in cross-section.

15. The wheel of claim 14, wherein the recess has a radial height along the rib which occupies almost the entire height of the rib.

16. The wheel of claim 3, further comprising an internal hub inside the inward arm and an anti-friction bearing disposed between the hub and the inward arm of the wheel.

* * * * *